United States Patent [19]
Brotz

[11] Patent Number: 5,497,861
[45] Date of Patent: Mar. 12, 1996

[54] VARIABLE MOTION DAMPENER

[76] Inventor: Gregory R. Brotz, P.O. Box 1322, Sheboygan, Wis. 53081

[21] Appl. No.: 265,957

[22] Filed: Jun. 27, 1994

[51] Int. Cl.[6] .................................................. F16F 15/03
[52] U.S. Cl. .................. 188/267; 188/299; 267/140.15; 267/140.5; 267/258
[58] Field of Search .................................. 188/267, 298, 188/299, 322.5; 248/562, 636; 267/64.13, 64.19, 64.23, 64.27, 35, 122, 140.14, 140.15, 219, 256, 258, 140.5; 192/21.5

[56] References Cited

U.S. PATENT DOCUMENTS

| | | | |
|---|---|---|---|
| 4,773,632 | 9/1988 | Hartel | 248/562 X |
| 4,869,476 | 9/1989 | Shtarkman | 188/267 X |
| 4,923,057 | 5/1990 | Carlson et al. | 188/267 X |
| 5,068,018 | 11/1991 | Carlson | 188/267 X |
| 5,249,784 | 11/1993 | Murakami et al. | 188/267 X |
| 5,267,633 | 12/1993 | Endo et al. | 248/636 X |
| 5,353,559 | 10/1994 | Murota et al. | 248/636 X |

Primary Examiner—Robert J. Oberleitner
Assistant Examiner—Alfred Muratori
Attorney, Agent, or Firm—William Nitkin

[57] ABSTRACT

A motion dampener to dampen the movement of an attached object such dampener having a flexible container holding electro-viscous fluid with at least two electrodes therein such that when electric current passes between the electrodes within the electro-viscous fluid, the fluid becomes more viscous to limit the range of movement of the container and the attached object.

3 Claims, 8 Drawing Sheets

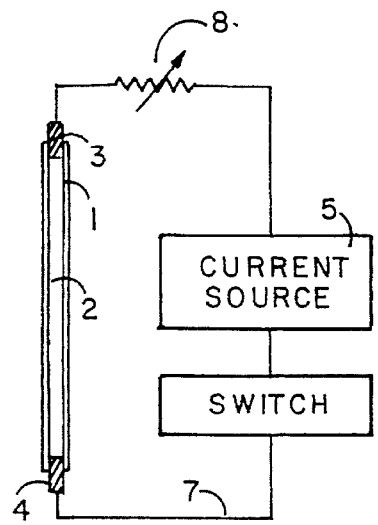
FIG. IA
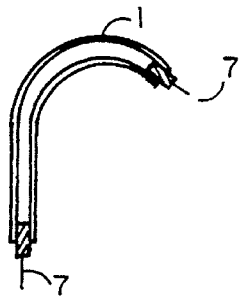
FIG. IB
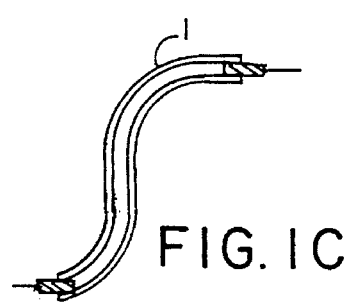
FIG. IC
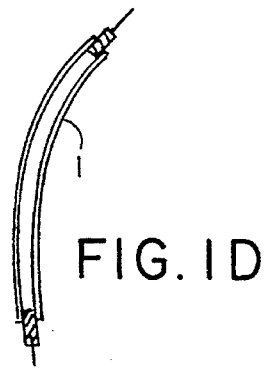
FIG. ID
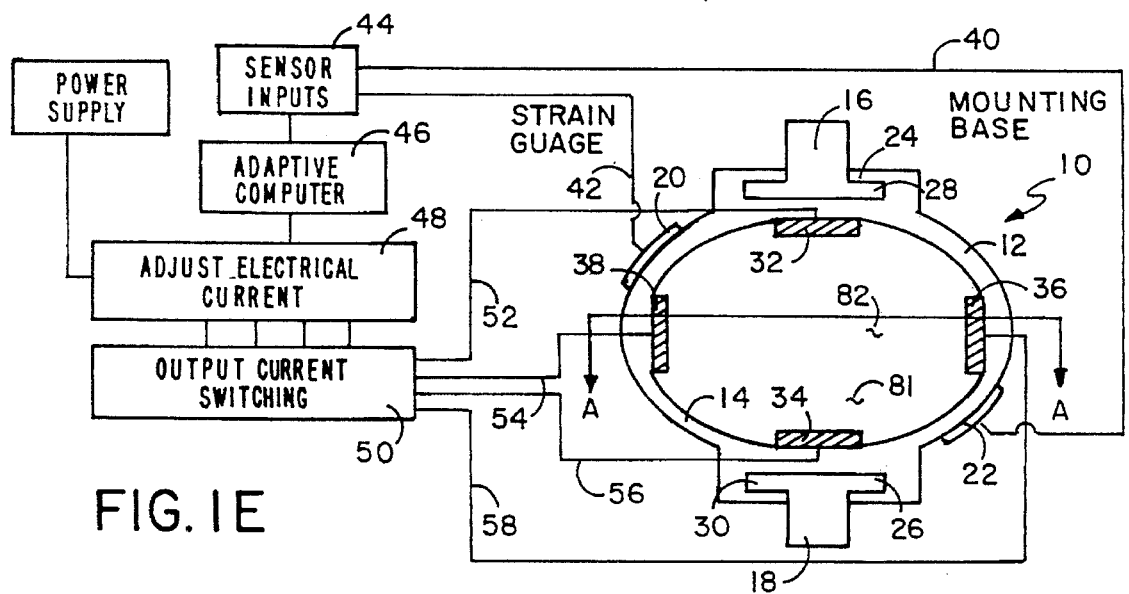
FIG. IE 5,497,861

VARIABLE MOTION DAMPENER

BACKGROUND OF THE INVENTION

1. Field of the Invention

The device of this invention resides in the area of dashpots and more particularly relates to a variable motion dampener for cushioning movement of various components within a mechanical or electrical system.

2. Description of the Prior Art

Dashpots or shock absorbers are well known in the prior art which, in general, utilize a fluid passing between chambers through apertures of varying diameters to cushion the impact of linear force on members attached at each end thereof for the absorption and dampening of such impact. Electrorheological fluids, hereinafter referred to as electro-viscous fluids, are also well known which fluids contain particulate materials suspended therein. When electrical current is passed through such fluid, such particulate materials align parallel to the flow of such electrical current and such aligned particle area becomes more viscous than the remaining fluid within the fluid container. Such electro-viscous fluids, when passed through a pipe or apertures, build up much friction due to the particulate nature of the suspended materials therein and decomposition of the fluid occurs. Thus such fluids have not been used in traditional shock absorbers of the prior art.

SUMMARY OF THE INVENTION

It is an object of this invention to provide a dashpot utilizing electro-viscous fluid which fluid is variably controlled to have increased or decreased resistance to multi-directional movement at various positions depending upon the desires of the user. It is a further object to provide a method of using and controlling such electro-viscous fluids in dashpots.

The device of this invention in one of its embodiments utilizes a spheroidal, high-temperature resistant, flexible container containing electro-viscous fluid with a minimum of two electrodes disposed within the container. In one embodiment electrodes are positioned within the container at the top, bottom, front, rear and on the two opposite lateral sides thereof. Each of the electrodes are independently controlled in terms of electrical current strength and polarity and can provide a current within the fluid from one or more of such electrodes to any of the other electrodes as selected by the user, in most cases determined by a computer. A mount can be attached at both the top and the bottom of the spheroidal container between, for example, an object to be cushioned and a base or whatever object requires motion dampening in relation to another object. The path in space/time that the mounted object takes can be controlled in microseconds by causing various volumes of the confined electro-viscous fluid to become solid or fluid as the overall deflective force dissipates through the lower mounting and into the base. In some instances the vibrational energy of the object's motion being dampened can be converted into thermal energy. The electrodes are activated selectively, stiffening or solidifying various particulate matter chains in the fluid within the spheroidal structure so as to cause various motion dampening effects and motion directional changes as will be described further below. In another embodiment of this invention, electro-viscous fluid can be incorporated within a coil spring structure or helical coil structure with electric current passed therethrough to cause a stiffening of the coil structure when desired.

BRIEF DESCRIPTION OF THE DRAWINGS

FIG. 1a illustrates a side cross-sectional view through a tube containing electro-viscous fluid.

FIG. 1b illustrates a side cross-sectional view through a tube containing electro-viscous fluid.

FIG. 1c illustrates a side cross-sectional view through a tube containing electro-viscous fluid.

FIG. 1d illustrates a side cross-sectional view through a tube containing electro-viscous fluid.

FIG. 1e illustrates a side cross-sectional view through the spheroidal embodiment of the shock-absorbing dashpot of this invention containing electro-viscous fluid and multiple electrodes therein.

DESCRIPTION OF THE PREFERRED EMBODIMENT(S)

Figure 1F:
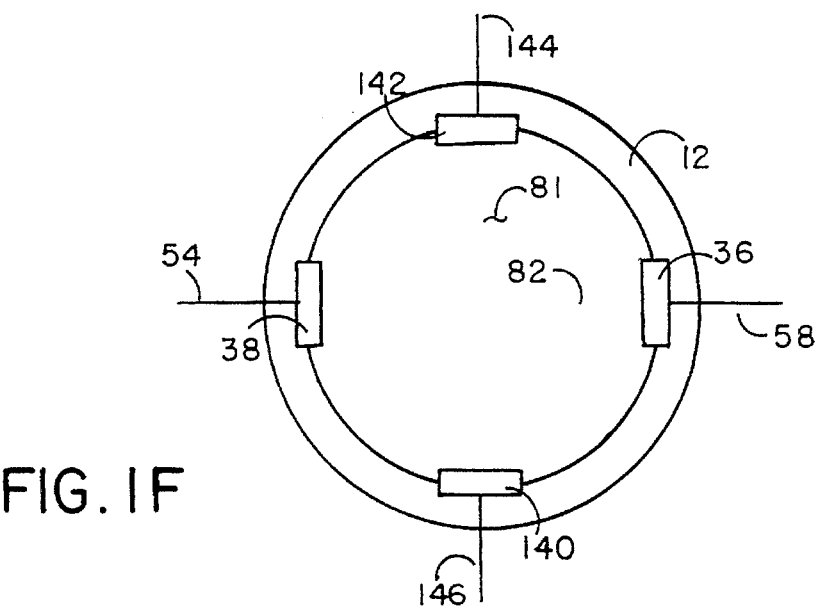
FIG. 1f illustrates a top view through section A—A of FIG. 1e.

FIG. 1a illustrates the device of this invention in its most basic form. A bendable elastic tube 1 is filled with electro-viscous fluid 2. First and second electrodes 3 and 4 are placed in each of the open ends of tube 1. A current source 5 is activated through switch 6 through electrical lines 7 to provide current at each end of the tube in contact with the electro-viscous fluid. A variable resistor 8 controls the amount of current to electro-viscous fluid 2. When switch 6 is open, elastic tube 1 is free to bend or twist. When switch 6 is closed, the electro-viscous fluid transforms to a solid and rigidifies elastic tube 1 in whatever position it happens to be in. For example, in FIG. 1b elastic tube 1 has been bent at the top and rigidified in that position due to electrical current being passed through the electro-viscous fluid through electrical line 7 from an electrical current source not illustrated in this view. It should be noted that, if desired, the flexibility of the tube can be controlled by electrically changing the viscosity of the fluid without completely rigidizing the tube. In FIG. 1c the elastic tube has been further bent at its bottom and rigidified as current is passed through the electro-viscous fluid. FIG. 1d shows a further view with elastic tube 1 bent to a less acute curve than the curve seen in FIG. 1b. Such elastic tube can be used for many purposes such as dampening the vibrations, for example, between its top near first electrode 3 and its bottom near second electrode 4. Other usages can be, for example, to use the embodiment seen in FIG. 1c when rigidified in such curved fashion as a drafting contour curve guide. Yet a further use can utilize the elasticity of the tube where it can be stretched along its length but returned to its original, unstretched shape at a desired speed or in increments, stopping at selected points in time or in multiple stages at a rate controlled by the activation or deactivation of switch 6. FIG. 1e illustrates a side cross-sectional view through spheroidal dashpot 10 having a flexible wall 12 which in a preferred embodiment is composed of a flexible, non-conductive, high-temperature resistant material such as rubber or equivalent. If wall 12 is made of a material that does have some conductivity, a lining 14 can be utilized made of a non-conductive material. At the top of the spheroidal dashpot is upper mount 16; at the bottom, lower mount 18. In use these mounts can be attached to whatever structure is having its movement effectively cushioned or lessened by absorption or slowing of such movement by the dashpot or otherwise have the path and/or velocity of the force controlled. The applications in which the dashpot of this invention could be utilized are innumerable, for example, in mechanical structures such as automobiles, as well as in electrical structures where variable cushioning is desired. Examples of such cushioning are in architectural design for earthquake protection and in limiting the vibration of trains. Variable cushioning is also desirable in low or high frequency acoustical applications and in precision manufacturing. Upper mount 16 is shown in this embodiment having an upper mount engagement member 28 engaged into upper mount receipt area 24 defined in the top of spheroidal dashpot 10 which effectively holds upper mount 16 to the top of the spheroidal dashpot. A similar structure is found in the bottom of the spheroidal dashpot where lower mount 18 has lower mount engagement member 30 held within lower mount receipt area 26 such that upper mount 16 and lower mount 18 are attached to the flexible, spheroidal dashpot. The dashpot has an open area 81 defined in its center containing electro-viscous fluid 82. A plurality of electrodes are mounted around the inside of the container. In the embodiment illustrated are seen upper electrode 32, lower electrode 34, right lateral electrode 36 and left lateral electrode 38. Although four electrodes are illustrated, more or fewer electrodes can be utilized. For example, a top view taken through section A—A of FIG. 1e seen in FIG. 1f, shows that there can be a front electrode 140 and a rear electrode 142 disposed around open area 81 containing electro-viscous fluid 82. The electrodes in FIGS. 1e and 1f are interconnected by electrical lines such as lines 52, 54, 56, 58, 144 and 146 to line current switcher 50 which directs current to selected of such electrodes in a pattern, as will be described further below, so as to cause current to pass between such selected electrodes in a desired pattern to cause the electro-viscous fluid to have its particles align in various particle-chain arrangements between such electrodes depending upon the nature of the dampening to be accomplished by the spheroidal dashpot of this invention. Upper strain gauge 20 and lower strain gauge 22 can sense movement of dashpot wall 12 and are attached, respectively, by upper strain gauge electrical line 42 and lower strain gauge electrical line 40 to sensor input receipt box 44 which indicates to an adaptive computer 46 which of the electrodes are to have current passed thereto so that current will pass from whatever electrodes are determined to be activated within the electro-viscous fluid containing area 81. The current levels can be adjusted by means of potentiometers and the like within line current controller 48 which current then passes through line switcher 50 which directs which of the four electrodes are to be turned on or off. Electro-viscous fluids change in their resistance to deformation according to the strength of the current being passed through them such that it is possible to achieve certain effects by ramping the electric current.

Figure 2:
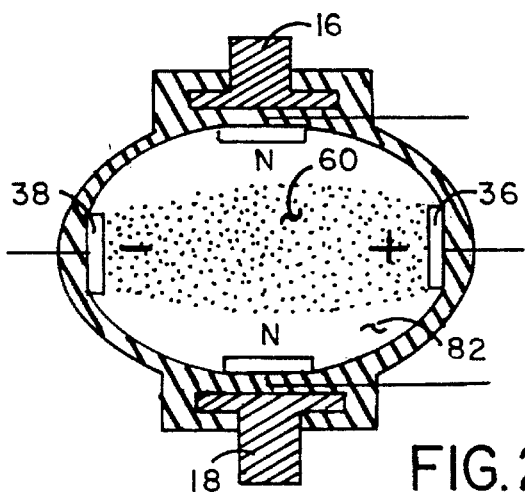
FIG. 2 illustrates a side cross-sectional view of a first embodiment of a viscous particle chain formed within the spheroidal dashpot of FIG. 1 by passing an electrical current through desired electrodes to align and stiffen the electro-viscous fluid directly therebetween.
Figure 3:
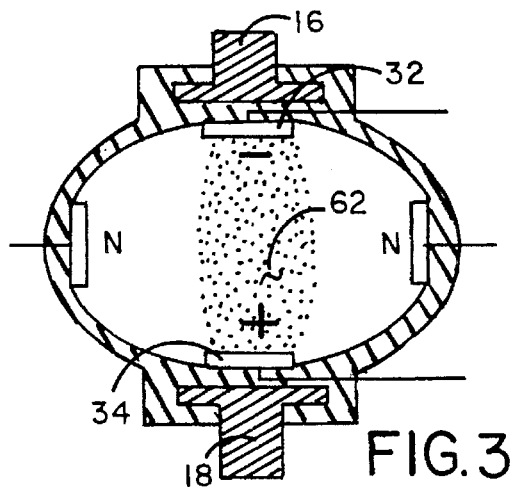
FIG. 3 illustrates a side cross-sectional view of a second embodiment of a viscous particle chain formed within the spheroidal dashpot of FIG. 1e by passing an electrical current through desired electrodes to align and stiffen the electro-viscous fluid directly therebetween.
Figure 4:
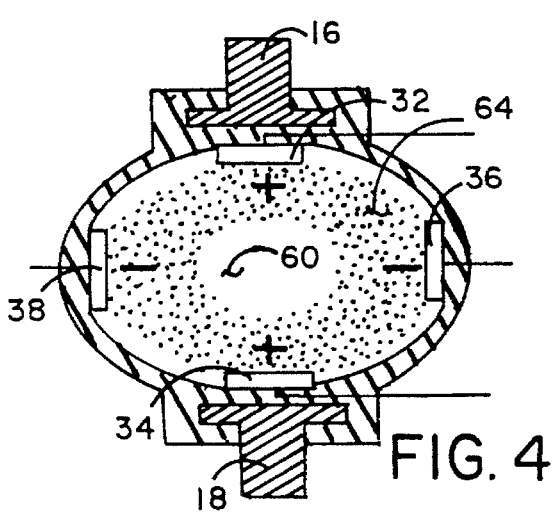
FIG. 4 illustrates a side cross-sectional view of a third embodiment of a viscous particle chain formed within the spheroidal dashpot of FIG. 1e by passing an electrical current through desired electrodes to align and stiffen the electro-viscous fluid directly therebetween.
Figure 5:
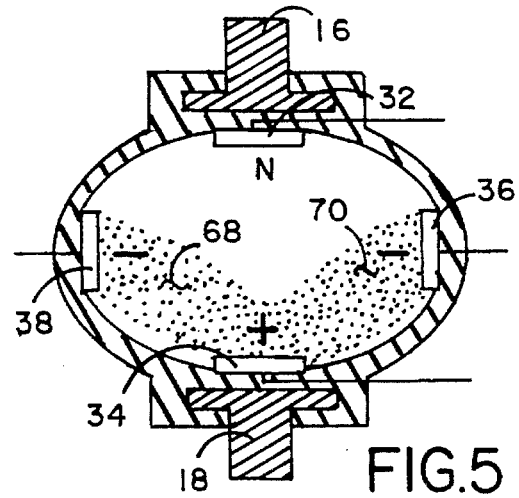
FIG. 5 illustrates a side cross-sectional view of a fourth embodiment of a viscous particle chain formed within the spheroidal dashpot of FIG. 1e by passing an electrical current through desired electrodes to align and stiffen the electro-viscous fluid directly therebetween.
Figure 6:
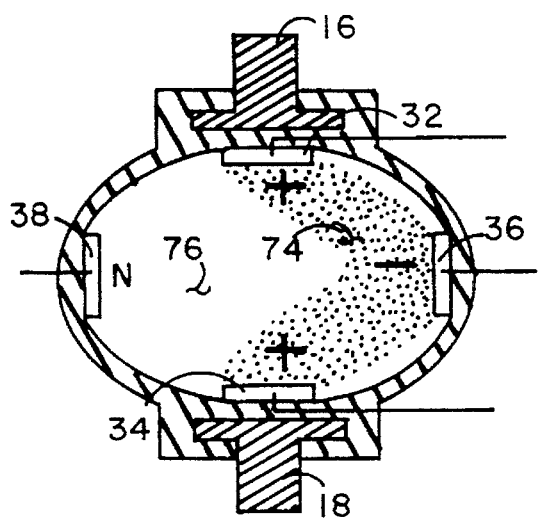
FIG. 6 illustrates a side cross-sectional view of a fifth embodiment of a viscous particle chain formed within the spheroidal dashpot of FIG. 1e by passing an electrical current through desired electrodes to align and stiffen the electro-viscous fluid directly therebetween.
Figure 7:
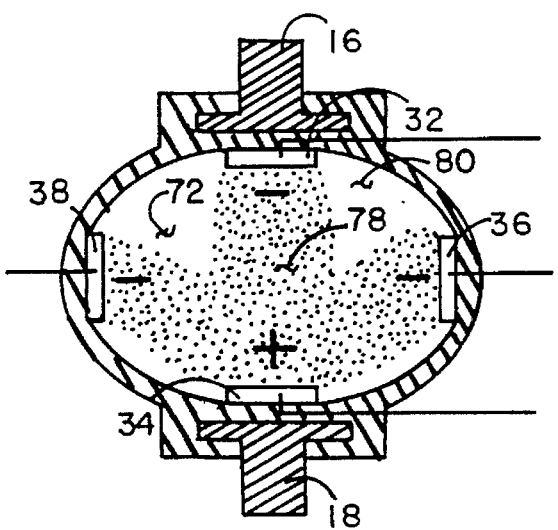
FIG. 7 illustrates a side cross-sectional view of a sixth embodiment of a viscous particle chain formed within the spheroidal dashpot of FIG. 1e by passing an electrical current through desired electrodes to align and stiffen the electro-viscous fluid directly therebetween.

In FIG. 2 current is directed to both right lateral electrode 36 and left lateral electrode 38, causing first particle chain 60 to be formed therebetween in electro-viscous fluid 82 which current causes a stiffening or increased viscosity of the electro-viscous fluid through the horizontal center of the spheroidal dashpot. Such action decreases the flexible or flowable volume of the electro-viscous fluid. FIG. 3 shows an alternate embodiment where current has been directed to upper electrode 32 and to lower electrode 34, forming a second particle chain 62 in the electro-viscous fluid 82 extending from the top to bottom of the spheroidal dashpot. In FIG. 4 the current has been directed to all four electrodes with opposite electrodes being of the same charge forming a third particle chain 64 therebetween and leaving a fluid area 66 within the third particle chain 64 which is still fluid. Alternate embodiments of particle-chain patterns can be formed, for example, as seen in FIG. 5 when bottom electrode 34 is activated in a way to interact with left lateral electrode 38, causing a fourth particle chain 68 to form therebetween and at the same time right lateral electrode 36 is activated in conjunction with the lower electrode 34, causing a fifth particle chain 70 to form therebetween. The interior particle chain patterns will cause different interaction of movement between the upper and lower mounts 16 and 18. The partial or quasi solidification of the electro-viscous fluid can occur between different electrodes by a very fast switching of the polarity of such electrodes, producing the ability for real-time dynamic control of such dashpot. In FIG. 6 three of the electrodes, being upper electrode 32, lower electrode 34 and right lateral electrode 36, are activated, forming a sixth particle chain 74 which is disposed predominantly on the right side of spheroidal dashpot 10, leaving a fluid area 76 to the left of such sixth particle chain. Such fluid area is more compressible for easier stretching of the left side of the dashpot wall than the left side. A similar type of viscous/solidified fluid arrangement is formed in FIG. 7 when upper electrode 32 is activated at the same time as the right lateral electrode 36, left lateral electrode 38, and lower electrode 34 are activated, causing a seventh particle chain 78 to be formed in the electro-viscous fluid and leaving fluid areas 72 and 80 above areas of such seventh particle chain. By selectively applying current of selected polarity to selected electrodes to vary the positioning of the resulting stiffened, viscous particle chain areas within the electro-viscous fluid within the dashpot, the movements of the upper mount in relation to the lower mount are affected and can provide increased cushioning or allow easier movement in desired directions of the objects that are attached to the upper and lower mounts 16 and 18, respectively. The ability to increase cushioning to allow easier movement or to increase the stiffening within the dashpot to restrict movements of the mounts in relation to one another can be utilized to affect any initial external deflecting force or when such force is no longer present, the mount can be allowed to return to its "normal" position.

Figure 8:
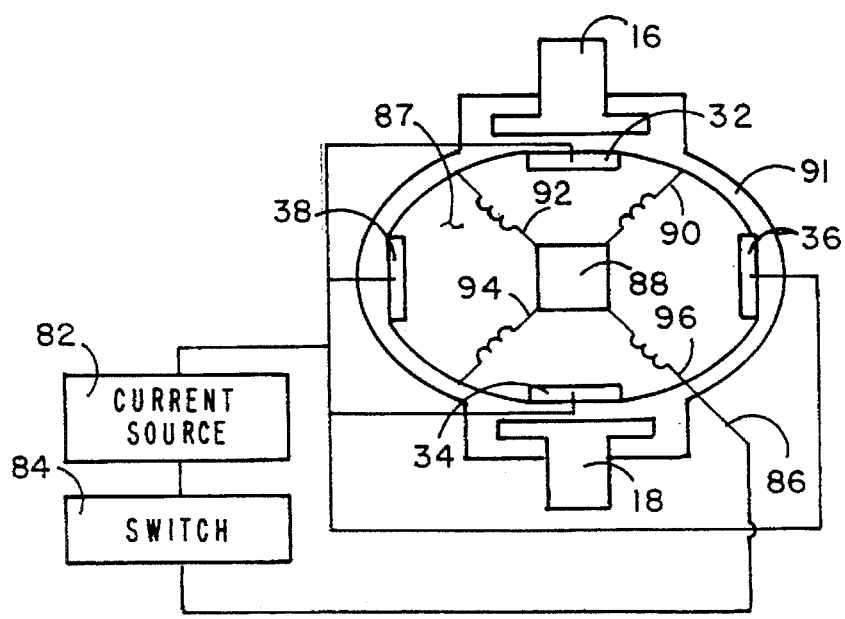
FIG. 8 illustrates the spheroidal dashpot of the type illustrated in FIG. 1e having a central electrode suspended therein.

In an alternate embodiment of the dashpot of this invention as seen in FIG. 8 not only can current source 82 direct current to the plurality of electrodes arrayed along the inner walls of chamber 91, but also switch 84 can direct current along line 86 to central electrode 88 which can be suspended within chamber 91 by first, second, third and fourth central electrode spring members 90, 92, 94 and 96. The selected activation of the fifth electrode in conjunction with electrodes 38, 32, 34 and 36 can produce a different particle chain pattern within the dashpot chamber to cause mounts 16 and 18 to have different movement characteristics than the other embodiments.

Figure 9:
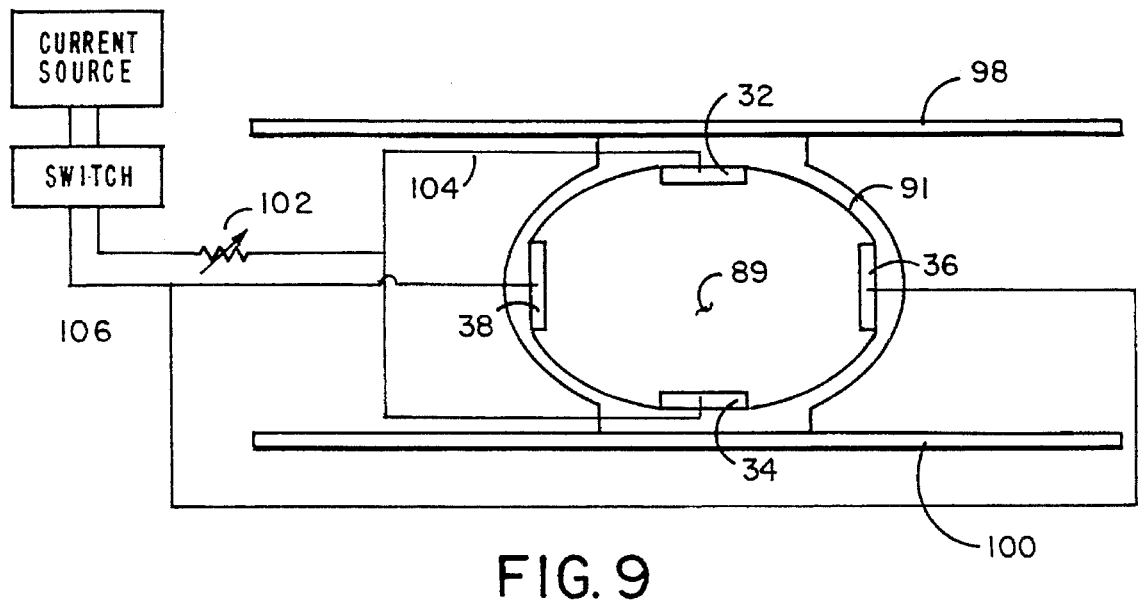
FIG. 9 illustrates a side cross-sectional view of a spheroidal dashpot having upper and lower contact surfaces to provide selected resistance through action of the dashpot to various movements that may occur on such contact surfaces.
Figure 10:
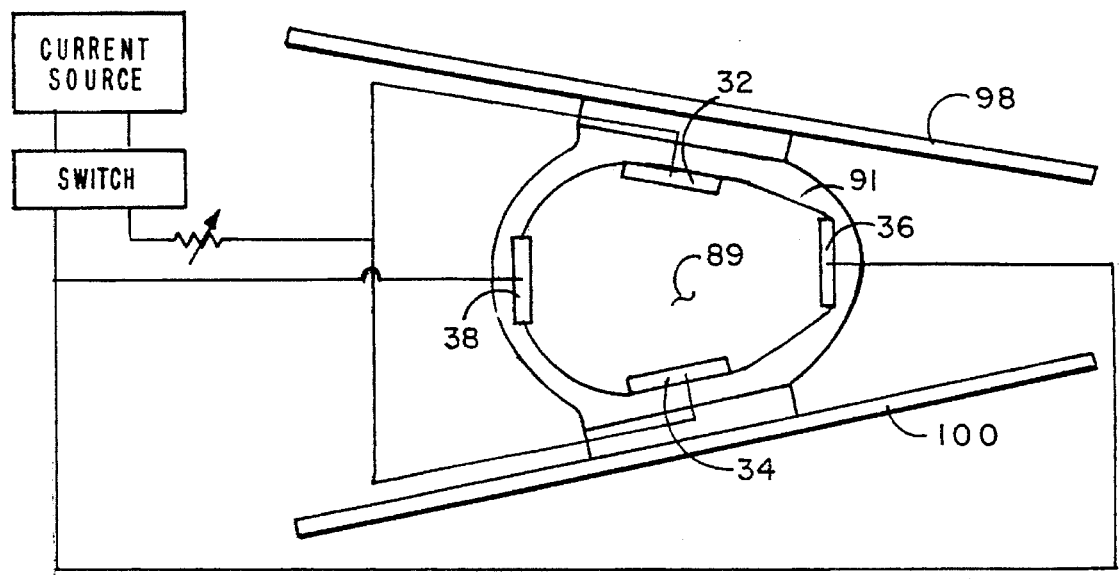
FIG. 10 illustrates a side cross-sectional view of the embodiment of FIG. 9 having its upper contact surface moved to an alternate position by pressure.

In a further alternate embodiment of the dashpot of this invention as illustrated in FIG. 9 the upper mount and lower mount can be engaged, respectively, to or replaced by upper contact surface 98 and lower contact surface 100 with a different electrode sequencing also illustrated wherein upper electrode 32 and lower electrode 34 are connected to the same power line through potentiometer 102 and the right and left lateral electrodes 36 and 38 are connected to the power supply through line 106. Utilizing a dashpot having this arrangement of electrode activation, one can have the viscous/solid particle chain configurations as seen in FIGS. 2 and 3 within electro-viscous fluid 89. This particle chain alignment can affect the movement of upper contact surface 98 and lower contact surface 100, as seen in FIG. 10, where the surfaces are moved to an angle to one another by either resisting such movement or more easily allowing such movement to a desired position. FIG. 9 illustrates the mounts in a resting state while FIG. 10 illustrates the mounts in one of many possible deformed states. The elongated mounting plates, such as upper contact surface 98 and lower contact surface 100, illustrate how strong angular leverage from a mounted object can be to deform the dashpots as greatly as shown in FIG. 10. The apparent amount of distance of the deformation and the control thereof by the dashpot occurs during mounting plate movement and after such movement the dashpot will revert back to its "rest" state as seen in FIG. 9.

Figure 11:
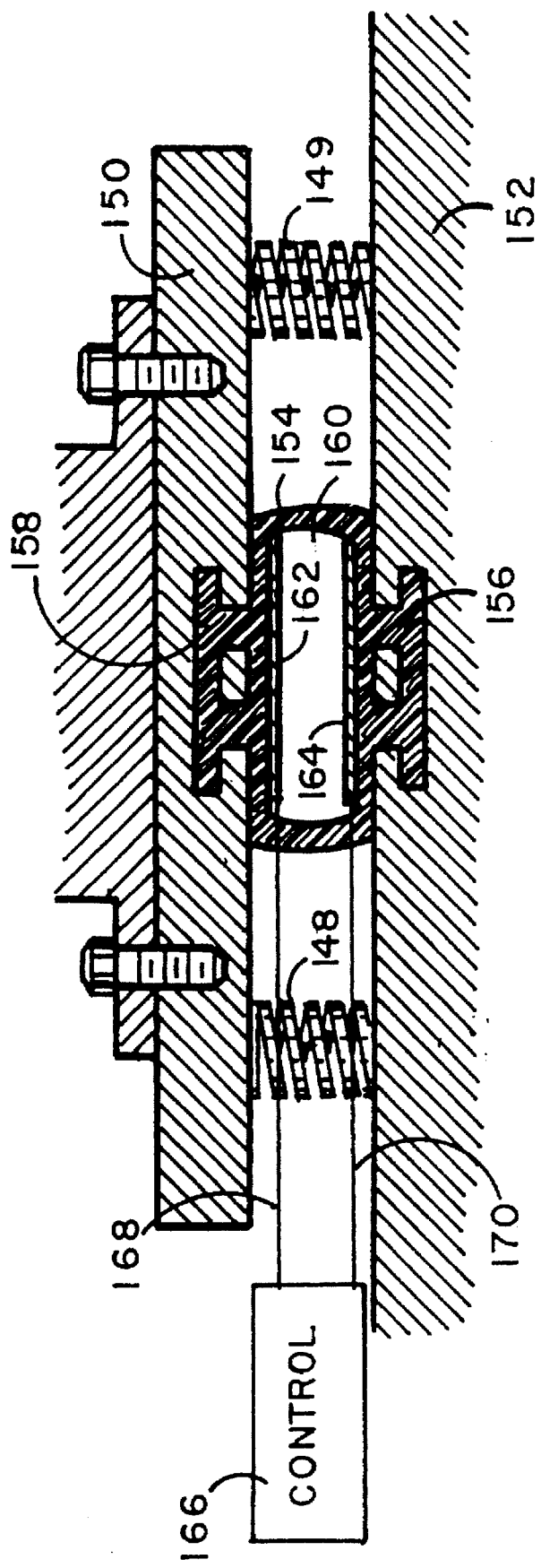
FIG. 11 illustrates a cross-sectional view through a dashpot used along with spring mountings.

FIG. 11 illustrates a mounting system utilizing spring members 148 and 149 between mounts 150 and 152. Disposed between mounts 150 and 152 is dashpot 154 with engagement members 156 and 158 securely held within mounts 150 and 152, respectively. Dashpot 154 contains electro-viscous fluid 160 between electrodes 162 and 164 to which electrical current through control box 166 is provided through electrical lines 168 and 170, respectively. Dashpot 154 can be made of a flexible, rubberlike material and can, when the electro-viscous fluid has current passed therethrough, become stiffened so as to restrict the movement of mount 150 in relation to mount 152. At times when it is desired to have freer movement between mount 150 and mount 152, control 160 ceases to direct electrical current through lines 168 and 170 to electrodes 162 and 164, causing electro-viscous fluid 160 to become fluid-like, thereby not restricting as much the movement of mount 150 in relation to mount 152. Multiple electrodes, as seen in the embodiments such as FIG. 1e, could be used in dashpot 154 to selectively control its resistance to movement. Such dashpots aid in control of vibration patterns of spring-supported machinery and/or other devices.

Figure 12:
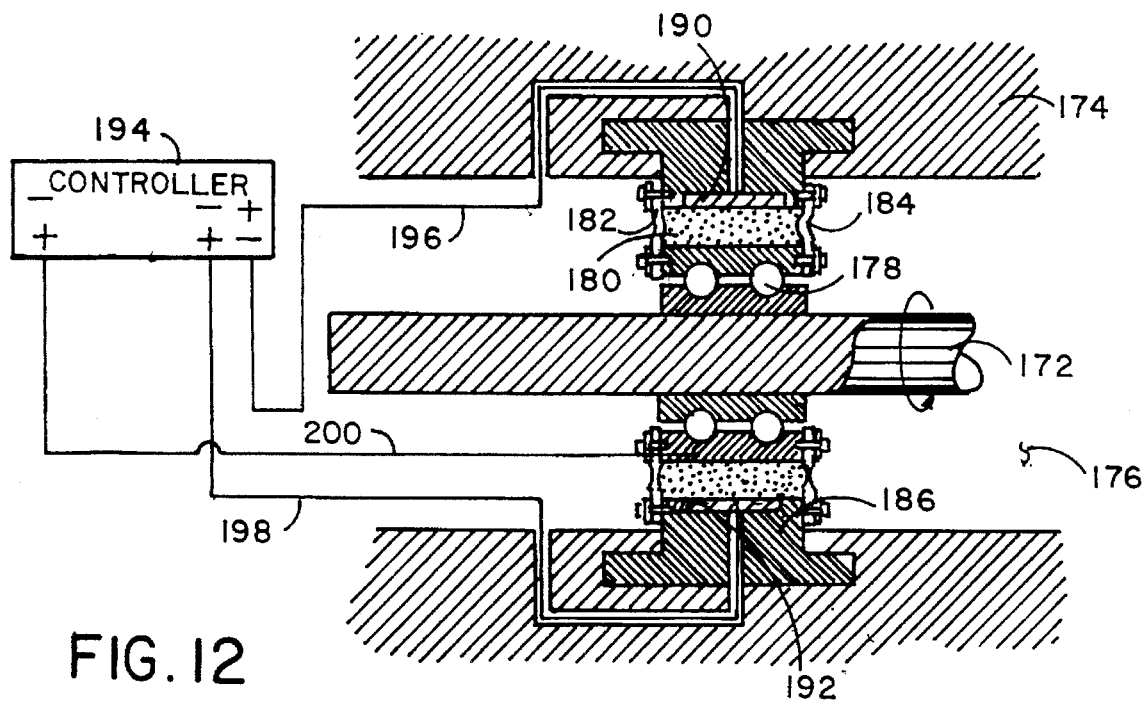
FIG. 12 illustrates a side cross-sectional view through a rotating shaft mounted between a base and machine structure.
Figure 13:
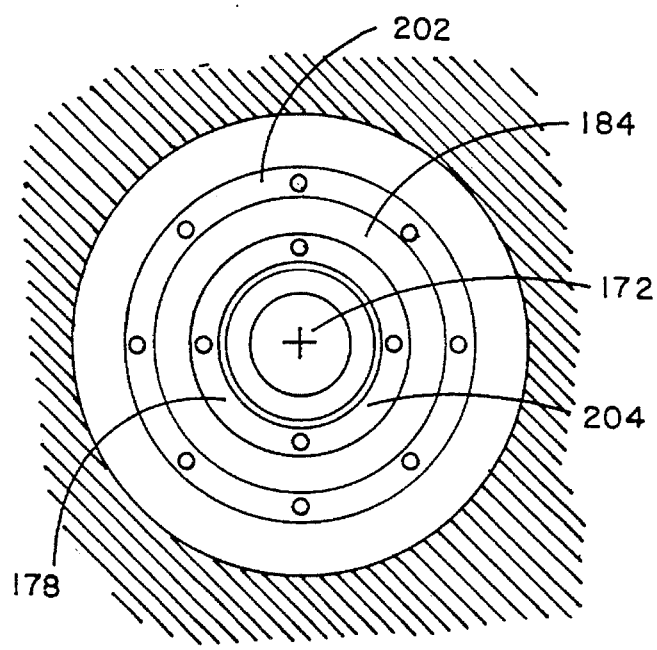
FIG. 13 illustrates an end view of the embodiment of FIG. 12.
Figure 14:
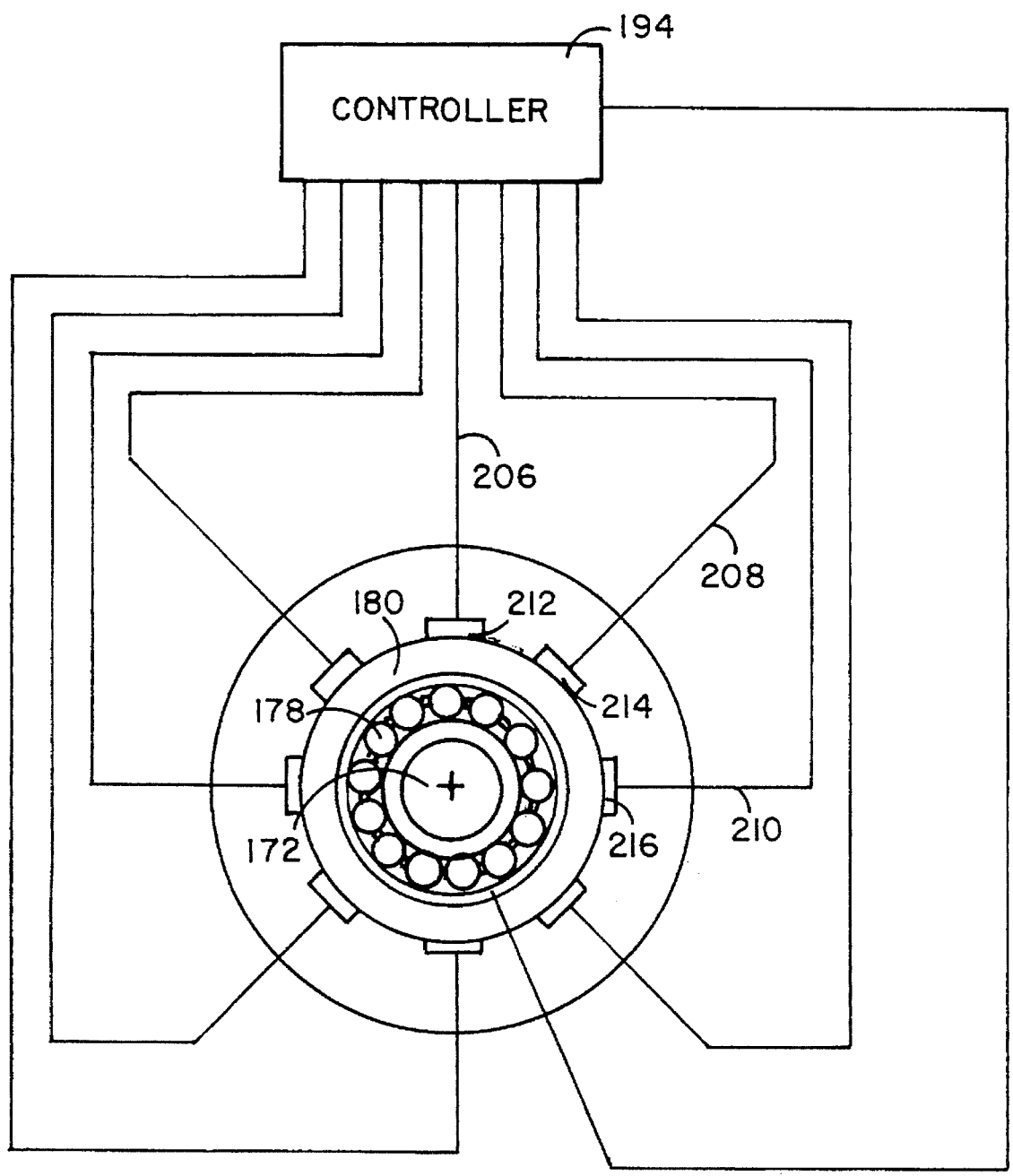
FIG. 14 illustrates an end schematic view of electrodes disposed around the electro-viscous fluid of the device of FIG. 12.

As machinery can be controlled in movement by the dashpot of this invention, so also can a rotating shaft have its movement restricted in relation to machinery structure as seen in FIG. 12. Rotating shaft 172 is seen disposed in aperture 176 within machine structure 174. The shaft is rotatably held within ball bearing 178 which is surrounded by electro-viscous fluid 180 held by first and second flexible rings 182 and 184 which are attached at their bottoms to the exterior of ball bearing 178 and at their tops to circular insulator ring 186 which is integrally held within machine structure 174. Electrodes 190 and 192 are interconnected by electrical lines 196 and 198, respectively, to controller 194. Ball bearing 178 is also connected by electric line 200 to controller 194. When controller 194 provides current at selected polarities between electrodes 190 and 192 or other electrodes disposed around the shaft as seen in FIG. 14, electro-viscous fluid 180 either stiffens, limiting the range of movement of shaft 172 or allows the shaft and bearing to move axially more freely in relation to machine structure 174. FIG. 13 is an end view of the embodiment of FIG. 12 showing shaft 172 held within ball bearing 178 with flexible ring 184 held in place by fastening rings 202 and 204.

FIG. 14 illustrates an end view of a possible electrode arrangement around electro-viscous fluid 180 as depicted in FIG. 12. In FIG. 14 shaft 172 is held within ball bearing 178 surrounded by electro-viscous fluid 180. A plurality of electrodes, such as electrodes 212, 214 and 216 are interconnected by electric lines such as lines 206, 208 and 210 to controller 194 which controls the sequencing and polarity of each electrode to affect the viscosity in desired areas of the electro-viscous fluid to react against pressures that may be placed on shaft 172 to aid in keeping shaft 172 in a desired location.

Figure 15:
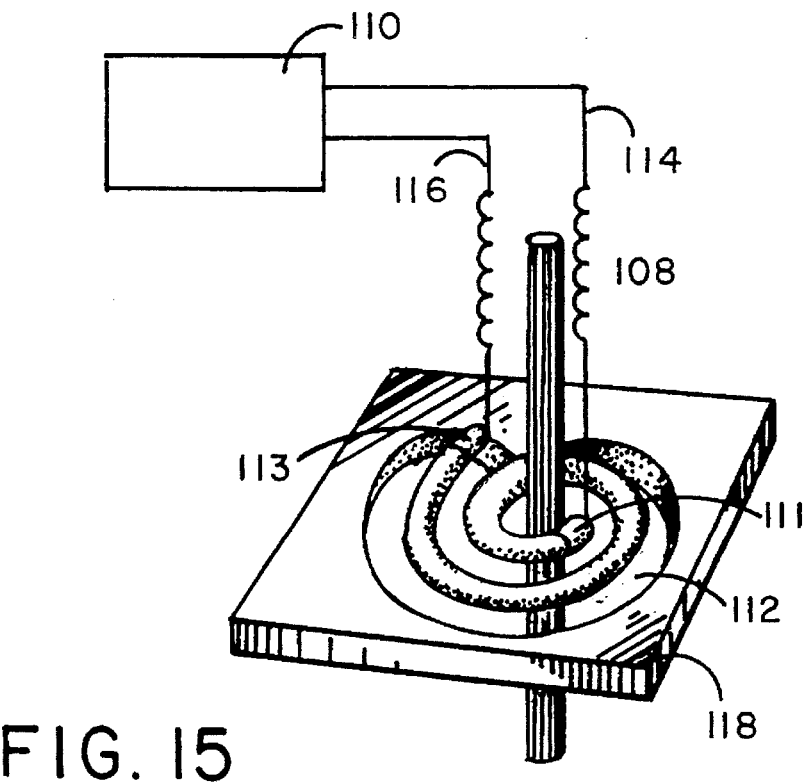
FIG. 15 illustrates a perspective partially cutaway view of an alternate embodiment of this invention being a helical coil containing an electro-viscous fluid therein.

In yet another embodiment of this invention as seen in FIG. 15 member support 108, to which a variety of different items not shown herein can be attached, can be mounted on helical shock absorber 112 having first end 111 and second end 113. Helical shock absorber 112 can be a flexible tube that contains an electro-viscous solution therein and has first electrical line 114 and second electrical line 116 running respectively to first and second ends 111 and 113 which lines receive electricity from controller 110. When current is turned alternately on or off, the electro-viscous fluid will alternately stiffen or remain fluid and can dampen or allow freer movement of member support 108 within base 118 in relation to base 118 depending on the requirements of the system in which such helical shock absorber 112 is utilized.

Figure 16:
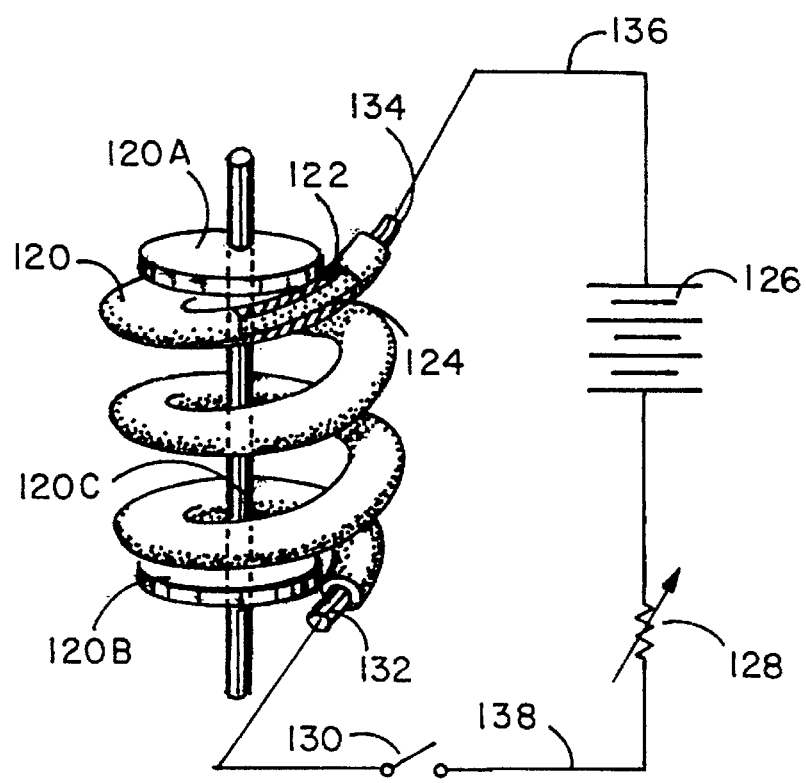
FIG. 16 illustrates a perspective view of a helical coil spring containing electro-viscous fluid therein.

FIG. 16 illustrates a structure that can be used in a similar manner to that shown in FIG. 15. Helical spring coil absorber 120 is seen mounted between flanges 120a and 120b through which pass shaft 120c which flanges can be mounted to equipment. Helical spring coil absorber 120 has a hollow channel 124 and if made of conductive material or metal has liner 122 therein which liner is electrically resistant. If the coil is made of plastic or other non-conductive material, no lining is needed. Such a helical coil or coil absorber can be made of spring steel with an electrically non-conductive lining, such as rubber, shown in partial cutaway view, leaving channel 124 to hold the electro-viscous fluid. Power supply 126 can direct current through potentiometer 128 to control the amount of electrical power directed to coil absorber 120. When switch 130 is turned on and current is directed through first and second electrical lines 136 and 138 to first coil electrode 134 and to second coil electrode 132, the electro-viscous fluid stiffens so that the helical spring coil absorber will not compress easily or resiliently expand after compression, thereby increasing or decreasing when needed the resistance to movement of the entire system when such a helical spring coil absorber is utilized. When current is turned off, the helical spring coil absorber will move in a springer manner. The change from liquid to solid in some electro-viscous fluids is measured in microseconds.

Although the present invention has been described with reference to particular embodiments, it will be apparent to those skilled in the art that variations and modifications can be substituted therefor without departing from the principles and spirit of the invention.

I claim:

1. A motion dampener disposed between a first and second object comprising:
   a flexible spheroidal container having a cavity defined therein and an inner wall;
   means to interengage said container between said first and second objects;
   electrorheological fluid contained within said container;
   a plurality of electrodes disposed along said inner wall in contact with said electrorheological fluid; and
   means in an on mode to pass current from a selected of said electrodes through said electrorheological fluid to another of said electrodes to cause said electrorheological fluid to become more viscous in a selected particle chain pattern to limit the movement of said container in relation to said first and second objects; means to select different ones of the electrodes to cause said electrorheological fluid to become more viscous in a different selected particle chain pattern and said means in an off mode to maintain the fluid nature of said electrorheological fluid to allow freer movement of said flexible container and said first and second objects interengaged thereto.

2. The device of claim 1 wherein said means in said on mode to cause increased viscosity along various selected paths between selected of said electrodes to cause said device to resist movement in multidirectional ways depending upon which of said electrodes has current running therebetween.

3. The motion dampener of claim 2 further including means to change the polarity of said electrodes.

* * * * *